United States Patent [19]

Clezio

[11] Patent Number: 5,709,129
[45] Date of Patent: Jan. 20, 1998

[54] GEARSHIFT CONTROL SYSTEM

[75] Inventor: Yvon Le Clezio, Beauvais, France

[73] Assignee: Massey-Ferguson S.A., France

[21] Appl. No.: 575,720

[22] Filed: Dec. 20, 1995

[30] Foreign Application Priority Data

Dec. 24, 1994 [GB] United Kingdom ............... 9426250

[51] Int. Cl.$^6$ ............... F16H 59/56; F16H 61/16
[52] U.S. Cl. ............ 74/336 R; 192/3.58; 192/3.63
[58] Field of Search ............... 74/335, 336 R; 192/3.58, 3.63

[56] References Cited

U.S. PATENT DOCUMENTS

| | | | |
|---|---|---|---|
| 4,625,841 | 12/1986 | Klatt | 192/3.63 |
| 5,099,711 | 3/1992 | Langbo et al. | 74/336 R |
| 5,117,710 | 6/1992 | Asano et al. | 74/336 R |
| 5,408,895 | 4/1995 | Chan et al. | 74/335 |
| 5,416,698 | 5/1995 | Hutchison | 192/3.63 X |
| 5,416,700 | 5/1995 | Bates et al. | 192/3.58 X |
| 5,436,833 | 7/1995 | Janecke | 74/336 R X |

FOREIGN PATENT DOCUMENTS

| | | |
|---|---|---|
| 161521 | 11/1985 | European Pat. Off. . |
| 217540 | 4/1987 | European Pat. Off. . |
| 517420 | 12/1992 | European Pat. Off. . |
| 2166208 | 4/1986 | United Kingdom ........ 192/3.63 |

*Primary Examiner*—Charles A. Marmor
*Assistant Examiner*—Nathan O. Jensen
*Attorney, Agent, or Firm*—MacMillan, Sobanski & Todd

[57] ABSTRACT

A gearshift control system comprises an electrical control unit which operates hydraulic valves controlling a hydraulic gearshift actuator. The vehicle in which the system operates has a dashboard control to preselect a gear change, which is actuated by depressing the clutch pedal operating a switch, both the switch and control being connected to the unit. The system includes means for updating the electronic stored values representative of the position of the gearshift actuator. The system also includes means for aborting a gearshift if, after given time periods, either the shift has not been completed, or the clutch pedal is released. In any event the gearshift will be aborted if the clutch is released during a change. The system will not initiate a gearshift unless the clutch pedal is held down for a given period of time.

6 Claims, 1 Drawing Sheet

GEARSHIFT CONTROL SYSTEM

BACKGROUND OF THE INVENTION

The present invention relates to a Gearshift Control System for a vehicle, and has particular application to a forward/reverse preselect vehicle transmission in which a direction change is selected with e.g., a dashboard control prior to disengaging the main clutch, and the gearshift subsequently occurs automatically when the clutch is disengaged. The invention is especially useful for tractors used in loading work where frequent forward/reverse gear shifts are required.

The invention addresses two principle technical problems, as follows:

The first problem is the management of the gearshift management actuator piston in response to the position of the clutch pedal in such a way that avoids fouling of the gears and results in simple operation for the driver. Potential problem areas are, e.g if the clutch pedal is momentarily accidentally pressed when a gear has been preselected, or is depressed insufficiently far. Alternatively the pedal might be disengaged too early, whilst the gearshift is still being carried out, or the synchromesh may not engage the new gear for some reason, e.g. the speed of the vehicle may be too high.

The second problem is the accurate sensing of whether a gear is engaged or not. Whilst when a transmission is new, it may be possible accurately to determine the position of the forward/reverse gear change actuator piston which results in a particular gear being engaged, this position may not remain the same once wear, settling in, etc has occurred.

SUMMARY OF THE INVENTION

According to a first aspect of the present invention, a preselect gear control system for a vehicle is provided, the system comprising a clutch control member and a clutch switch responsive to the control member's position, a preselect switch for selecting between at least first and second gear ratios, indicator means for indicating when a particular gear ratio is engaged and when a particular gear ratio is selected, a gearshift actuator and a control unit responsive to inputs from the said clutch position sensor and gear selector and having outputs to the said indicator means and gearshift actuator, the control unit including gearshift aborting means for instructing the gearshift actuator to move to neutral if a gearshift attempt fails.

According to a second aspect of the present invention a gearshift control system for a vehicle is provided, the system including a control unit, a gearshift actuator movable between a plurality of gear engaging positions, and a sensor for sensing the displacement of the actuator in at least one of the said gear engaging positions, the control unit including storage means for storing a value representative of the actuator displacement for at least one of the said engaging positions, and the control unit further including means for updating the said value by replacing it with value corresponding to a sensed displacement.

DETAILED DESCRIPTION

Figure 1:
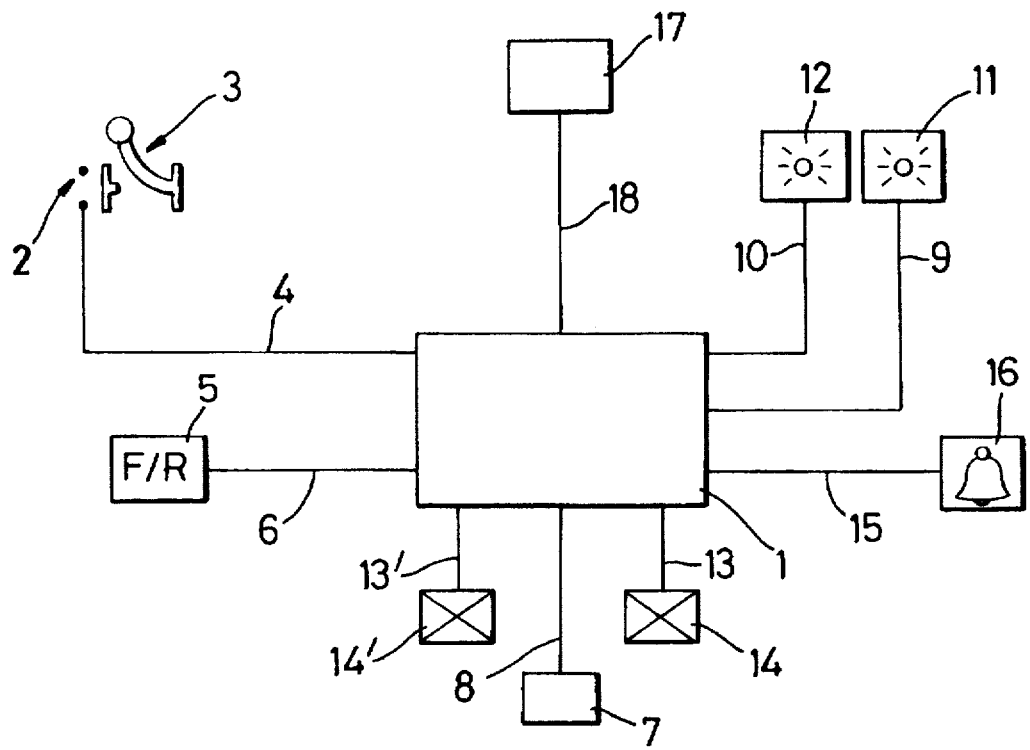
FIG. 1 is a schematic diagram representing a control system in accordance with the invention.

Referring to FIG. 1, the control system comprises a central control unit 1, a clutch pedal 3 and a clutch switch 2 ("on" if clutch pedal fully depressed) connected via clutch position signal line 4 to the central control unit 1. An actuator piston 19 is moved by hydraulic pressure from lines 20 and 20' from hydraulic valves 14 and 14', connected to the control unit 1 via control lines 13 and 13'.

A preselect switch 5 is connected via preselect signal line 6 to the control unit 1. The switch 5 can be a simple button which is depressed when, for example one wishes to change from forward to reverse gears.

A gearshift actuator piston 19, which is connected mechanically to operate a synchromesh mechanism, has a displacement sensor 7 with an analogue electronic output connected via actuator displacement signal line 8 to the central control unit.

The central control unit 1 has electronic indicator light outputs connected via indicator light signal lines 9, 10 to respective indicator lights 11, 12. The control unit also has an audible alarm output connected via audible alarm signal line 15 to an audible alarm 16.

A speed sensor 17 is connected to the control unit via speed signal line 18.

The control unit I fulfils a number of functions which might be carried out by separate dedicated items of electronic hardware but, more usually, would all be performed by a single appropriately programmed processor.

Figure 2:
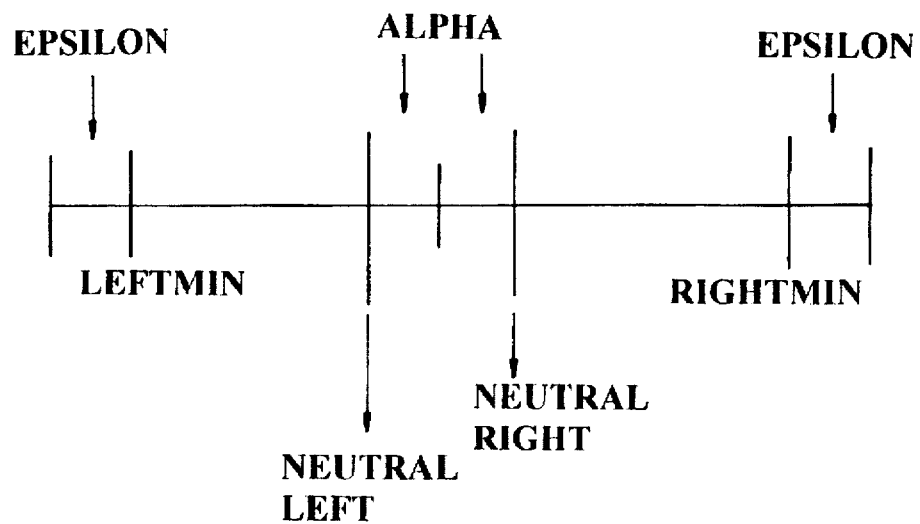
FIG. 2 is a schematic diagram showing the range of movement of an actuator piston of a control system in accordance with the invention.

Before the control system can operate, it is initialised. With reference to FIG. 2, initialisation involves moving the actuator piston, by means of a valve 14, to an extreme (eg to the left in FIG. 2) of its range of movement determined in practice by the synchromesh to which it is connected and recording in a store (memory) a value representative of the actuator displacement, as sensed by the displacement sensor 7, adjusted by a set margin EPSILON (see FIG. 2). This gives a threshold LEFTMIN over which the control unit will consider the gear to be engaged.

In this system, an array is created in which the value for LEFTMIN is entered 5 times. The reason for this will be explained later. A further memory location NOVRAM (LEFTMIN) is used to store the average of these 5 values. The average value will of course, initially, be identical to each of the 5 values.

The process is then repeated for the opposite extreme of movement of the actuator piston using valve 14' to give a value for the other threshold RIGHTMIN.

A neutral position is then calculated half way between LEFTMIN and RIGHTMIN, and upper and lower thresholds NEUTRAL LEFT and NEUTRAL RIGHT calculated by adding and subtracting a constant ALPHA. The central control unit 1 will now consider the transmission to be in neutral, at least for the purposes of the forward/reverse preselect control, when the actuator lies between NEUTRAL LEFT and NEUTRAL RIGHT, to be in forward gear when the displacement is below RIGHTMIN and reverse gear when the displacement is above LEFTMIN.

Once the system has been initialised, after each movement of the piston into forward or reverse a self adjusting routine is gone through as follows.

The last measured displacement of the current actuator piston position is stored in the array, displacing one of the old values, and the 5 values in the array are averaged. The value stored in NOVRAM, that is the previous stored average of the 5 array values, is compared with the new average. If the difference is more than a set reference value, the value of NOVRAM is set to the new average, otherwise it remains unchanged.

In this way, the NOVRAM values are constantly updated. Using the average of 5 values and only changing NOVRAM for differences of more than a given value, ensures that any adjustment is gradual.

A number of functions in the control unit are provided to ensure the safety of the system.

Firstly, the control unit will only initiate a gear shift if the tractor speed is below a given value, e.g. 2 kilometers an hour for low range and 5 kilometers an hour for high range. The clutch pedal must also be held fully down for 300 mS before the control unit will initiate a shift. If the pedal is held down for less than 100 mS, no action is taken. If it is held down for more than 100 mS and less than 300 mS, the control unit moves the actuator automatically to neutral.

Once these two conditions are met, (ie the speed condition and the clutch pedal being held down for more than 300 mS) a signal is sent to the actuator piston to move. If the synchromesh does not engage within 2 seconds, the control unit automatically puts the actuator piston to neutral and an audible warning sounds.

If the clutch is inadvertently engaged by releasing the pedal whilst the actuator piston is travelling between forward and reverse, the control unit will automatically instruct the actuator to go into neutral.

Once the actuator is in neutral a shift can of course be re-initiated by releasing the clutch pedal and depressing it for 300 mS or more again.

I claim:

1. A preselect gear control system for use with a vehicle clutch and transmission assembly having a plurality of gear ratios and a neutral gear ratio, said preselect control system comprising:

a gearshift actuator adapted to operate the transmission in one of the plurality of gear ratios or in the neutral gear ratio;

a clutch control member adapted to operate the clutch in either an engaged condition or a disengaged condition;

a clutch switch responsive to movement of said clutch control member for generating a signal when the clutch is operated in the disengaged condition;

a preselect switch for generating a signal which is representative of a desired gear ratio for the transmission;

a control unit responsive to said clutch switch signal and said preselect switch signal for actuating said gearshift actuator to operate the transmission in the neutral gear ratio if the clutch switch signal is generated for longer than a first predetermined time period and less than a second predetermined time period, and for actuating said gearshift actuator to operate the transmission in the desired gear ratio if the clutch switch signal is generated for longer than said second predetermined time period.

2. The preselect gear control system defined in claim 1 wherein said control unit is responsive to said gearshift actuator for actuating said gearshift actuator to operate the transmission in the neutral gear ratio if the transmission is not shifted into a gear ratio within a predetermined time period.

3. The preselect gear control system defined in claim 1 wherein said control unit is responsive to clutch switch signal and said gearshift actuator for actuating said gearshift actuator to operate the transmission in the neutral gear ratio if the clutch is engaged before the transmission is shifted into a gear ratio.

4. The preselect gear control system defined in claim 1 wherein said control unit is responsive to the elapsing of a first predetermined time interval following actuation of said clutch control member to initiate a gearshift.

5. The preselect gear control system defined in claim 4 wherein said control unit is further responsive to the elapsing of a second predetermined time interval, greater than said first predetermined interval, following actuation of said clutch control member to operate the transmission in the neutral gear ratio if the transmission is not shifted into a gear ratio within said second predetermined time interval.

6. The preselect gear control system defined in claim 1 wherein said control unit is responsive to the speed of the vehicle to initiate a gearshift if said speed of the vehicle is below a maximum reference value.

* * * * *